(12) United States Patent
Chiang

(10) Patent No.: US 12,466,112 B2
(45) Date of Patent: Nov. 11, 2025

(54) DEMOLDING METHOD AND MOLD STRUCTURE FOR EXTRUSION MOLDING

(71) Applicant: Jung Chi Chiang, Taichung (TW)

(72) Inventor: Jung Chi Chiang, Taichung (TW)

( * ) Notice: Subject to any disclaimer, the term of this patent is extended or adjusted under 35 U.S.C. 154(b) by 111 days.

(21) Appl. No.: 18/538,500

(22) Filed: Dec. 13, 2023

(65) Prior Publication Data

US 2025/0050550 A1    Feb. 13, 2025

(30) Foreign Application Priority Data

Aug. 11, 2023   (TW) .................. 112130359

(51) Int. Cl.
*B29C 33/44*    (2006.01)

(52) U.S. Cl.
CPC .................. *B29C 33/444* (2013.01)

(58) Field of Classification Search
CPC ..... B29C 33/44; B29C 33/442; B29C 33/444; B30B 11/02; B30B 11/027; B30B 11/04; B30B 15/062; B30B 15/32
See application file for complete search history.

(56) References Cited

U.S. PATENT DOCUMENTS

| | | | | |
|---|---|---|---|---|
| 3,132,378 A * | 5/1964 | Johannigman | .......... | B30B 15/32 |
| | | | | 425/DIG. 129 |
| 3,743,101 A * | 7/1973 | Schmidt | .............. | B29C 48/6912 |
| | | | | 210/447 |
| 3,762,264 A * | 10/1973 | Scott | ....................... | B21D 28/34 |
| | | | | 279/4.12 |
| 3,809,518 A * | 5/1974 | Lloyd | ..................... | B29C 45/04 |
| | | | | 425/587 |
| 3,965,721 A * | 6/1976 | Roch | ..................... | B21D 5/0272 |
| | | | | 72/448 |
| 4,027,867 A * | 6/1977 | Pollington | ............... | B25B 5/087 |
| | | | | 269/94 |
| 4,410,169 A * | 10/1983 | Swenson | ................. | B25B 5/061 |
| | | | | 269/32 |
| 5,035,845 A * | 7/1991 | Gasiorek | ................. | B22F 1/148 |
| | | | | 264/109 |
| 5,698,149 A * | 12/1997 | Hinzmann | ............ | B30B 15/022 |
| | | | | 264/318 |

(Continued)

FOREIGN PATENT DOCUMENTS

| | | | | |
|---|---|---|---|---|
| EP | 2098352 A2 | * | 9/2009 | ........... B29C 45/332 |
| GB | 2082945 A | * | 3/1982 | ............. B25B 5/087 |

*Primary Examiner* — Matthew J Daniels
(74) *Attorney, Agent, or Firm* — LANWAY IPR SERVICES; Chun-Ming Shih

(57) ABSTRACT

A mold structure for extrusion molding contains: a first mold assembly, a second mold assembly, a mold plate, a first guide plate set, a second guide plate set, a first support plate set, and a second support plate set. The first mold assembly includes a punch head and a cylinder connector. The second mold assembly includes a receiving chamber configured to accommodate the punch head. The mold plate includes a discharge orifice and a contact face. The first guide plate set and a second guide plate set are fixed on the mold plate and are configured to lock with the second mold assembly. The first support plate set and the second support plate set are mounted on the mold plate, and tops of the first support plate set and the second support plate set are locked with the first guide plate set and the second guide plate set.

3 Claims, 4 Drawing Sheets

(56) References Cited

U.S. PATENT DOCUMENTS 6,843,402 B2 * 1/2005 Sims .................. B25C 7/00
                                                             227/119
7,459,120 B2 * 12/2008 Herod ................ B29C 51/10
                                                             264/2.7

* cited by examiner

DEMOLDING METHOD AND MOLD STRUCTURE FOR EXTRUSION MOLDING

TECHNICAL FIELD

The present disclosure relates to a demolding method and a mold structure for extrusion molding which improve demolding questions in power extrusion molding process.

BACKGROUND

Incinerators are one of the common methods of garbage disposal today. However, incinerated slag and other wastes contain toxic substances that are harmful to the human body. In compliance with environmental regulations, various safety protection measures must be completed on site before transportation, so the powder is extruded. Molding technology is then used to extrude waste powdery materials into block objects to facilitate packaging and subsequent transportation and processing.

In response to the above requirements, the conventional extrusion molding method mostly uses ejection of the finished product from bottom to top after extrusion is completed, resulting in the following shortcomings:
1) The finished product is easily broken during the ejection process, causing the punch head and ejection pin to become stuck due to powder jam in the mold and unable to operate continuously.
2) When the finished product is demolded from the mold from bottom to top, the punch head needs to be removed first and then the finished product is ejected, resulting in longer operating time and increased processing costs.

The present invention has arisen to mitigate and/or obviate the afore-described disadvantages.

SUMMARY

A primary aspect of the present invention is to provide a demolding method and a mold structure for extrusion molding which solve the problem that the punch head and the ejector pin are stuck due to powder jam in the mold, which affects the smooth operation.

When demolding, the powders are not blocked, and a slope is formed on an abutting face of the first support plate set, the second support plate set includes a slope formed on an abutting face thereof and configured to mate with the slope of the abutting face of the first support plate set, and the mold plate includes a slope formed on the contact face thereof and configured to mate with the slope of the abutting face of the first support plate. Thereby, a power of the mold plate is decreased when demolding, thus obtaining smooth operation efficiency.

Secondary aspect of the present invention is to provide a demolding method and a mold structure for extrusion molding which are capable of overcoming long operation time by horizontally moving the mold plate back and forth and by using the discharge orifice.

Another aspect of the present invention is to provide a demolding method and a mold structure for extrusion molding which are capable of solving delivery problem, wherein the push sheet of the mold plate pushes the finished product to demold, thus enhancing production efficiency.

Other objects and features will be in part apparent and in part pointed out hereinafter.

DETAILED DESCRIPTION

Figure 1:
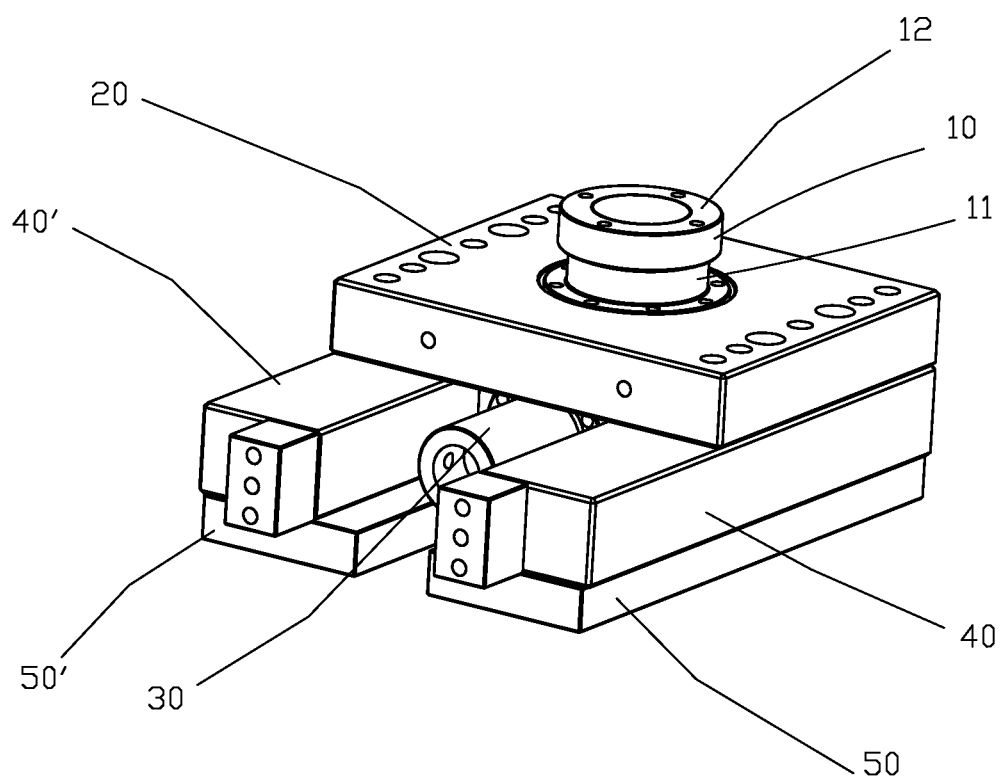
FIG. 1 is a perspective view showing the assembly of a mold structure for extrusion molding according to a preferred embodiment of the present invention.
Figure 2:
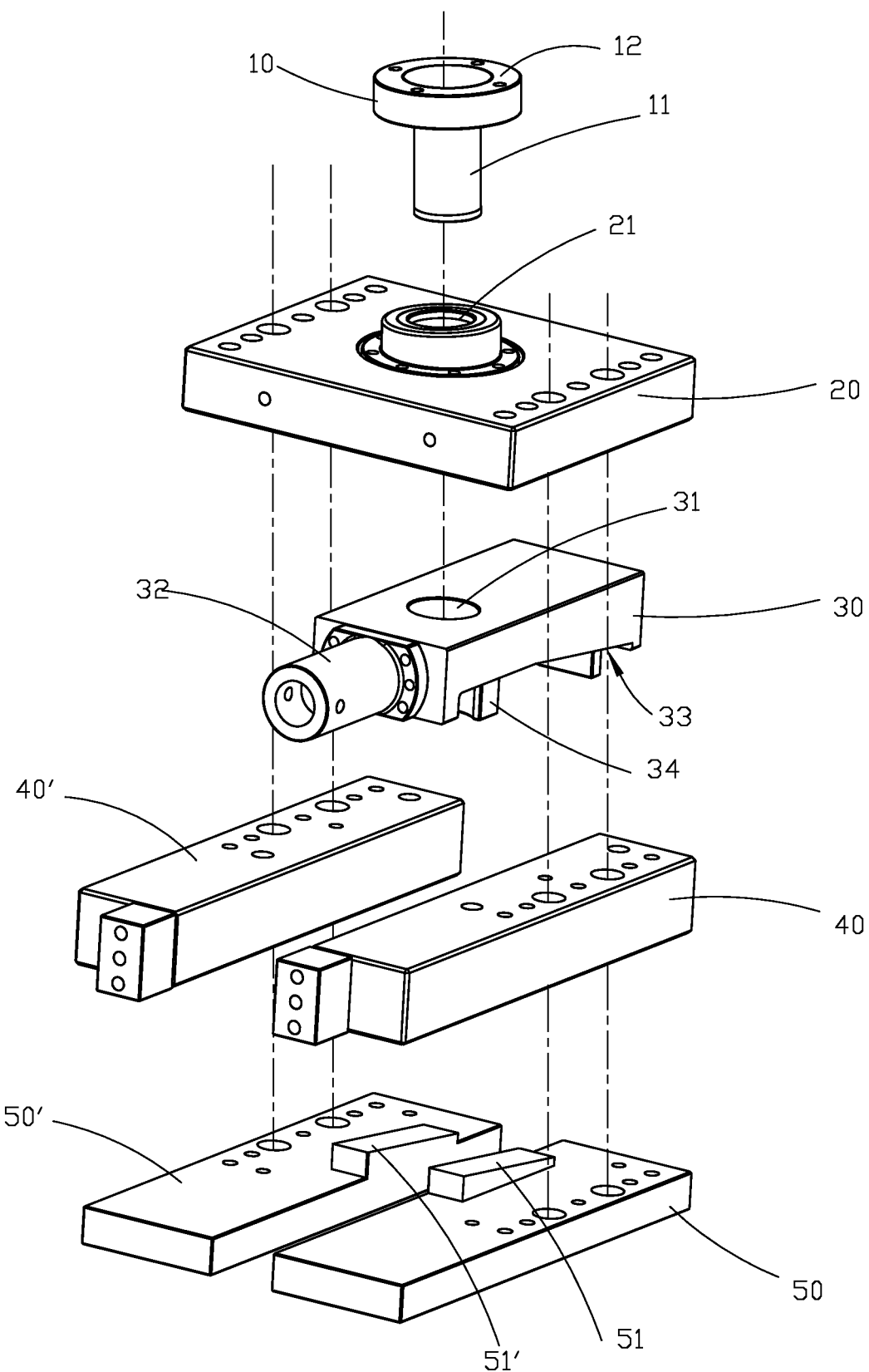
FIG. 2 is a cross sectional view showing the exploded components of the mold structure for the extrusion molding according to the preferred embodiment of the present invention.
Figure 3:
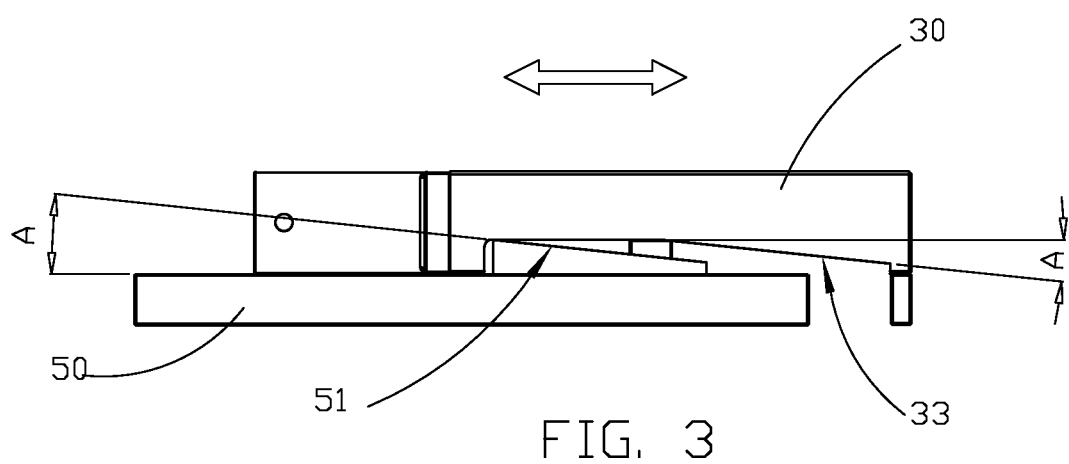
FIG. 3 is a side plan view showing the operation of the mold structure for the extrusion molding according to the preferred embodiment of the present invention.

With reference to FIGS. 1-3, a mold structure for extrusion molding according to a preferred embodiment of the present invention comprises: a first mold assembly 10, a second mold assembly 20, a mold plate 30, a first guide plate set 40, a second guide plate set 40', a first support plate set 50, and a second support plate set 50'.

The first mold assembly 10 includes a punch head 11 formed on a first end thereof, and the first mold assembly 10 includes a cylinder connector 12 configured to reciprocately move upward and downward. The second mold assembly 20 includes a receiving chamber 21 defined therethrough and configured to accommodate the punch head 11. The mold plate 30 includes a discharge orifice 31 defined therethrough, a contact face 33 formed on a bottom of the mold plate 30, wherein a top of the mold plate 30 is connected with the second mold assembly 20, and the mold plate 30 also includes a cylinder connector 32 extending from an end thereof and configured to move horizontally. The first guide plate set 40 and the second guide plate set 40' are fixed on two sides of the mold plate 30 and are configured to lock with the second mold assembly 20. The first support plate set 50 and the second support plate set 50' are mounted on a bottom of the mold plate 30, and tops of the first support plate set 50 and the second support plate set 50 are locked with the first guide plate set 40 and the second guide plate set 40'.

A slope A is formed on an abutting face 51 of the first support plate set 50, and the second support plate set 50' includes a slope A formed on an abutting face 51' thereof and configured to mate with the slope A of the abutting face 51 of the first support plate set 50.

Referring to FIG. 3, a slope A between the abutting face 51 of the first support plate set 50 and the mold plate 30 is within 3 degrees to 10 degrees, and a slope A between the abutting face 51' of the second support plate set 50' and the mold plate 30 is within 3 degrees to 10 degrees.

Figure 4:
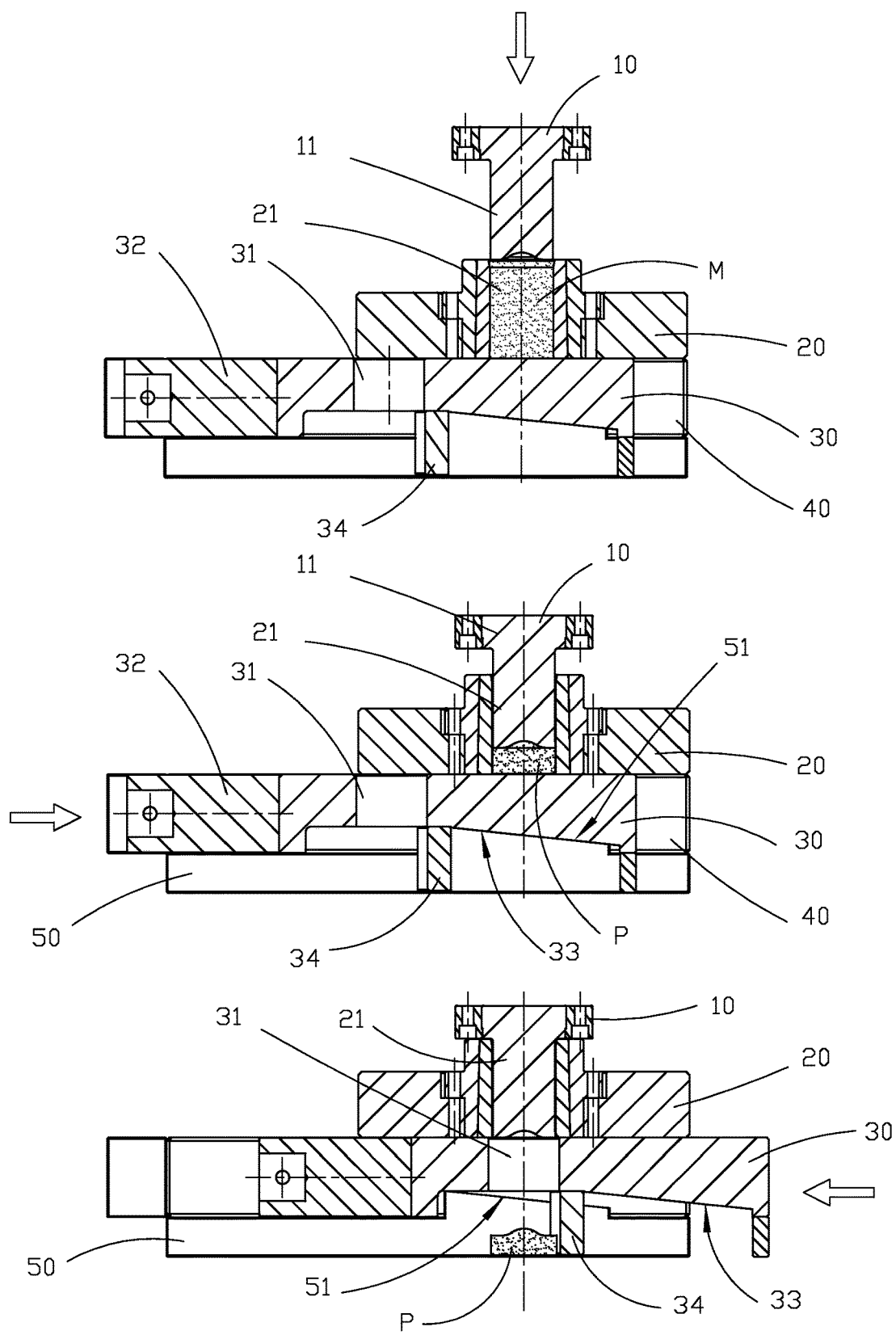
FIG. 4 is a cross sectional view showing the operation of the mold structure for the extrusion molding according to the preferred embodiment of the present invention.

As shown in FIG. 1 and FIG. 4, a mold structure for extrusion molding comprises a push sheet 34 formed on the mold plate 30.

As illustrated in FIG. 4, in operation, a material M is placed on the receiving chamber 21 of the second mold assembly 20, and a bottom of the receiving chamber 21 of the second mold assembly 20. Then, the material M is extrusion molded by the punch head 11 of the first mold assembly 10 and is delivered horizontally to the discharge orifice 31 by the mold plate 30 to align with the receiving chamber 21, in the meantime, the bottom of the receiving chamber 21 is opened to drop a finished product P, thus finishing the extrusion molding. Thereby, the first support plate set 50 includes the slope A formed on the abutting face 51 thereof, and the mold plate 30 includes a slope A formed on the contact face 33 thereof and configured to mate with the slope of the abutting face 51 of the first support plate 50, thus move the mold plate 30 downward easily. Before next extrusion molding, the mold plate 30 moves horizontally to the discharge orifice 31 so as to remove from the receiving chamber 21, hence the bottom of the receiving chamber 21 is closed, and the push sheet 34 pushes the finished product P to away from the discharge orifice 31, thus repeating the extrusion molding.

Accordingly, the demolding method and the mold structure for the extrusion molding is capable of demolding quickly without accumulating powders in the mold structure by horizontally moving the mold plate back and forth and by using the discharge orifice. The slope A is formed on the abutting face 51 of the first support plate set 50, and the second support plate set 50' includes the slope A formed on the abutting face 51' thereof and configured to mate with the slope A of the abutting face 51 of the first support plate set 50, such that a sliding power of demolding is decreased to enhance working efficiency. In addition, the push sheet of the mold plate pushes the finished product to demold, thus enhancing production efficiency.

When introducing elements of the present invention or the preferred embodiments thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A mold structure for extrusion molding comprising:
a first mold assembly including a punch head formed on a first end of the first mold assembly, and the first mold assembly including a cylinder connector configured to reciprocately move upward and downward;
a second mold assembly including a receiving chamber defined therethrough and configured to accommodate the punch head;
a mold plate including a discharge orifice defined therethrough, a contact face formed on a bottom of the mold plate, wherein a top of the mold plate is connected with the second mold assembly, and the mold plate also includes a cylinder connector extending from an end thereof and configured to reciprocately move horizontally;
a first guide plate set and a second guide plate set fixed on two sides of the mold plate and are configured to lock with the second mold assembly;
a first support plate set and a second support plate set mounted on a bottom of the mold plate, wherein tops of the first support plate set and the second support plate set are locked with the first guide plate set and the second guide plate set;
wherein a slope is formed on a contact face of the first support plate set, the second support plate set includes a slope formed on a contact face thereof, and the mold plate includes a slope formed on the contact face thereof, such that the contact face of the first support plate set and second support plate set mate with the slope on the contact face of the mold plate.

2. The mold structure for the extrusion molding as claimed in claim 1, wherein a slope between the contact face of the first support plate set and the mold plate is within 3 degrees to 10 degrees, and a slope between the contact face of the second support plate set and the mold plate is within 3 degrees to 10 degrees.

3. The mold structure for the extrusion molding as claimed in claim 1 further comprising: a push sheet formed on the mold plate.

* * * * *